March 6, 1928.
J. J. KEYSER
1,661,256
COMBINED COUPLING AND BEARING
Filed June 22, 1925
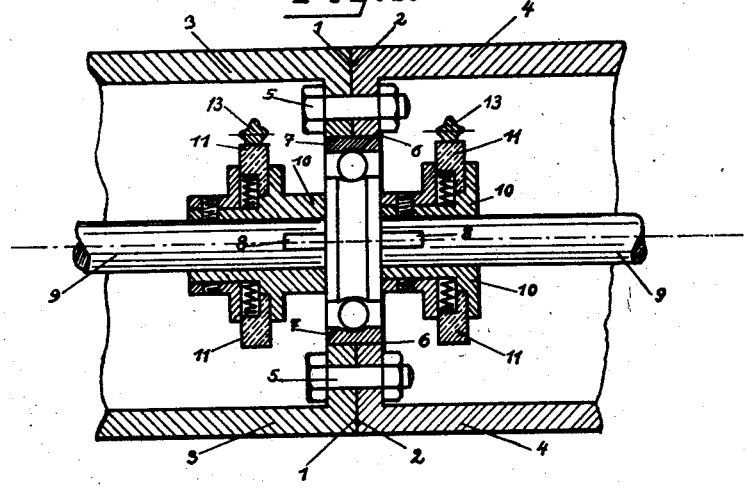
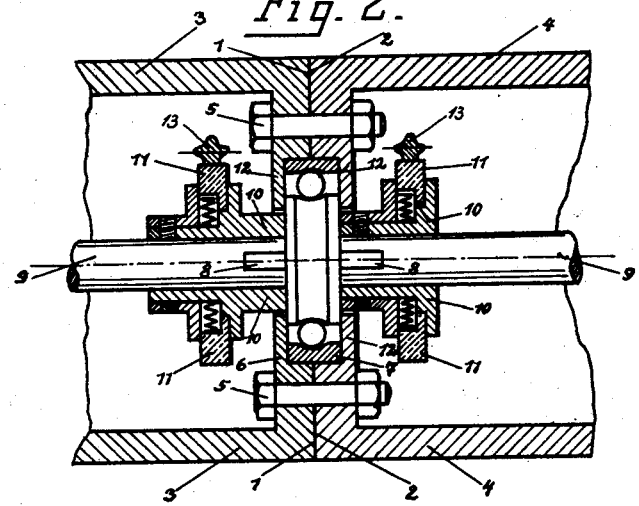
Witnesses:
Inventor:

Patented Mar. 6, 1928.

1,661,256

UNITED STATES PATENT OFFICE.

JOHANN JACOB KEYSER, OF AARAU, SWITZERLAND.

COMBINED COUPLING AND BEARING.

Application filed June 22, 1925, Serial No. 38,893, and in Germany April 3, 1925.

With the known constructions of the carrying beams for the worm gear actuated spindles or cops of spinning, twisting and the like machines the bearings for the driving shaft of the spindles are normally carried on screw bolts by means of a groove or the like, which requires a careful adjustment if the machine is to run smoothly. It frequently occurs however that the screw bolts are loosened by the vibrations of the carrying beam whereby the actuating shaft becomes loose and can be displaced thereby endangering the safe actuation of the spindles or cops.

According to this present invention these deficiencies are avoided by the ends of two adjoining beam casings being rigidly connected with each other and constructed as a common support for the bearings of the actuating shafts. The actuating shafts are thus completely stationarily supported whereby the greatest possible exactness for the spindle actuation is obtained. The ball bearing is thus forming the only connection to the outside or to the adjacent beam respectively and is at the same time used for centering the casings with relation to each other.

In the drawing illustrating two preferred embodiments of my invention

Fig. 1 is a horizontal section through the bearing point of two adjacent bearing beam casings, Fig. 2 the same section through another embodiment.

The end faces 1, 2 of the two adjoining bearing beam casings 3, 4 are rigidly held together by the screw bolts 5 and after such attachment provided with the bore 6 for the reception of the ball bearings 7. The studs 8 of the inner member of the ball bearings 7 are used for the connection of the actuating shaft sections 9. By sliding the sleeves 10 for the worm gears 11 the shafts 9 are attached to the studs 8. According to Fig. 2 the front walls 1, 2 of the beams 3, 4 can be provided with flanges 12 projecting up to the proximity of the sleeves 10 in order to prevent the entrance of dust to and the exit of oil from the ball bearings 7.

The beam sections 3 and 4 which carry the screw spindles 13 are attached to each other according to requirement. The attachment is effected by the screws 5. In order that the beam sections may be precisely joined to each other, the end faces 1 and 2 of two adjoining beam sections are very carefully worked and the hole 6 receiving the ball bearings 7 is bored after the sections having been connected with each other by the screw bolts 5. The ball bearing 7 is mounted in the opening 6 with a tight fit. The main shaft 9 is not extending through several beam sections but is so sectioned that each beam section supports a shaft section which can be taken out from its pertinent beam section without influencing the other actuating shaft sections.

To this end the inner member 14 of the ball bearing 7 is provided with two flat studs 8 projecting into corresponding recesses 15 of the shaft sections 9. The shafts 9 are locked to the studs 8 by sliding sleeves 10 thereover carrying the outer gears 11 for the actuation of the spindles 13 and carried around by the sleeves 10 by intermediary of friction springs 17. The sleeves 10 are held by screws 16 in their positions on the shafts 9. The ball bearings 7 result in an exact centering of the beam sections whereby a precise running of the shaft 9 is obtained. The ball bearings are forming the only interconnection of the inner spaces of the beams and the connection thereof to the outside, so that the exit of oil and the entrance of dust is to a considerable extent prevented. In order to still better obtain this purpose the bore 6 for the ball bearing is not completely passing through the end faces 1, 2, so that the members 12 are left laterally covering the ball bearings 7.

What I claim as my invention is:—

1. A spinning and twisting machine beam comprising aligned beam sections having contacting end walls, shaft sections within the beam sections and constituting one continuous spindle actuating shafting, bearings having their seat in the end walls of two adjoining beam sections so as to be in a reciprocal centering and aligning interrelation therewith and forming means for supporting the shaft sections within the beam sections of which the bearing seating end walls are forming a portion, and means on the ends of each shaft section and on the bearings for clutching the shaft sections together while permitting mounting and dismounting of each shaft section while all of the bearings remain seated in their respective beam section end walls.

2. A spinning and twisting machine beam comprising a plurality of beam sections each having end walls whereby it is connected to an adjacent beam section, a shaft section within each beam section, bearings interposed between the shaft sections of adjoining beam sections and having a reciprocal centering and aligning interrelation with both end walls of their respective pair of adjoining beam sections in which they are seated and means on the intermediate bearings and on the shaft sections for so coupling the shaft sections to one continuous and aligned shafting, that each shaft section may be removed while the two bearings carried in it remain undisplaced in their seats within the two beam section end walls carrying them.

3. A spinning and twisting machine beam comprising a plurality of beam sections connected to each other to an extended beam member so that the end walls of adjacent beam sections are in a tight face-to-face contact, a spindle actuating shafting extending through the beam member and ball bearings for the said shafting stationarily carried by the end walls of either pair of adjoining beam sections and comprising each inner and outer ball races and balls between both races, the end walls of the beam sections constituting flanges bridging the gap between the inner and outer races of the ball bearings, substantially as described.

In testimony whereof I have affixed my signature.

JOHANN JACOB KEYSER.